April 13, 1937. A. KRATKY 2,076,952
PRODUCTION OF HARD METAL ALLOYS
Filed Aug. 21, 1935

INVENTOR
ANTON KRATKY
BY
Richards & Geier
ATTORNEYS

Patented Apr. 13, 1937

2,076,952

UNITED STATES PATENT OFFICE 2,076,952

PRODUCTION OF HARD METAL ALLOYS

Anton Kratky, Vienna, Austria

Application August 21, 1935, Serial No. 37,114
In Austria June 8, 1934

6 Claims. (Cl. 75—137)

This invention relates to the production of hard metal alloys. In recent years a number of hard metal alloys have become known, for use mainly in the working of materials of all kinds, for example in the facing or pointing of cutting tools.

These alloys generally contain as basic material hard carbides either alone or in commixture with one or more hard nitrides with which there are alloyed, by sintering, an auxiliary metal of considerably lower melting point, predominantly iron, cobalt, or nickel, or alternatively chromium and other low or high fusing metals.

The auxiliary metal (added in proportions of 5 to about 20%) serves the purpose, primarily, to bind or weld together the particles of hard carbide and/or hard nitride, with a view to obtaining sintered pieces that are less brittle than the shaped articles produced from hard carbides or hard nitrides alone by sintering or by casting. The welding or soldering together of the particles of the alloy mixture in this manner is generally effected by sintering at temperatures but slightly below the melting point of the auxiliary metal or metals used.

All sintered parts produced in the above-described manner, however, show a more or less pronounced degree of porosity which impairs their value in the service of the ultimate purposes for which they are intended to be used. Even sintered parts produced under compression (a process which is incidentally attended with very great difficulties) are still almost always somewhat porous at the core, since the compressing force does not become adequately propagated through the extremely rough mass in which great adhesive forces take effect. The internal intergranular friction set up in compressed articles of this description during the molding process is uncommonly high, and can only be completely overcome with difficulty and generally not at all. Molded articles in which the auxiliary metal or metals are subsequently alloyed by liquation are also still somewhat porous, especially at the core, and in addition are of considerable brittleness since they assume almost the character of cast products.

I have now found, as the result of exhaustive experimental work, that these drawbacks can only be overcome by producing bodies of the described nature not in a single working operation by means of a press, according to the proposals and attempts made hitherto, but by the formation of numerous superposed thin layers compressed individually and consecutively and welded together by pressure.

It has hitherto been usual to subject the molded bodies made from suitable metallic powders, for effecting consolidation, to thermal treatment (sintering) for many hours or for some days at increasingly elevated temperatures. No sintering is necessary, however, in the method of working according to the present invention.

The production of a hard metal alloy in accordance with the method of the present invention can be carried out in practice, for example, in the following manner:

A pulverulent alloy mixture consisting for example of tungsten carbide with an addition of 8% of an auxiliary metal, for example iron, is strewn in a thin layer, say 1/100th of a millimetre thick, on to a suitable substratum, for example an iron plate, so that this latter (of an area say of 2 x 10 cm.) is completely covered. In this case the substratum is preferably kept constantly at a temperature of about 1000 or 1200° C. Over this thin layer there is then passed, once or repeatedly, a pressure roller, for example of tungsten metal, and preferably highly polished, or a likewise highly polished sliding block of tungsten metal, sapphire, diamond, or the like, or a pressing die is brought to bear for a very short time, preferably for a fraction of a second. High pressure is advantageous but is not indispensable when the alloy is built up of layers of the above-mentioned order of thinness. It is sufficient for example, when working on a surface of the above-mentioned size (2 x 10 cm.), for the pressure rollers to exert a pressure of some 10–20 kgs. This relatively low pressure is fully adequate in conjunction with the high temperature specified. A second thin layer is then applied, and again subjected to pressure as before. This procedure is repeated until the hard metal layer has become built up to the required thickness of say 5–10 mm. or more. It is generally sufficient to pass the pressure roller once over the entire surface for each individual layer. In this case a useful hard metal body of 5 mm. thickness can be produced after 500 repetitions of the rolling operation.

If desired, the hard metal body thus formed can be detached subsequently from the substratum. If this be the intention, however, it is advisable to coat the upper surface of the substratum beforehand with a galvanically deposited layer for example of nickel. It is equally possible though to leave the hard metal attached to the substratum, and to use both together for example in the facing or tipping of tools (see Figs. 6 and 7).

The products thus obtained exhibit practically no pores, even when the ground and etched surface is examined under powerful magnification. If desired, such bodies may also be homogenized by subsequent prolonged heating, by virtue of diffusion processes brought about thereby in the interior thereof. Such after-treatment can generally be dispensed with, however. The ground and etched surface generally shows the advantageous fibrous structure (produced by the rolling action) aimed at for the purposes in view.

The manufacturing process described can be carried out in an atmosphere of protective gas (coal gas, hydrogen, or the like) or in vacuo, or alternately in an atmosphere of protective gas and in a vacuum. As additions to the alloy mixture there can also be employed metalloids such as for example silicon, boron, and the like. In place of the metals themselves (for example iron, nickel) it is also possible to employ, as additions to the alloy mixture, the oxides thereof which undergo reduction to metal in the course of the manufacturing process, due to the action of the protective gas (for example hydrogen).

The bodies of hard metal alloy produced in this manner, which thus consist of a large number of superposed and inter-welded thin layers, are as a rule superior to those hitherto known and produced by sintering, combined sintering and pressing, or fusing. In consequence of the peculiar method of manufacture adopted, namely building up in a series of consecutive thin layers, internal stresses are almost invariably avoided in the finished bodies.

The products obtained by the method of the present invention can also be employed for other working implements and parts, such as drawplates, sandblast nozzles, as bearing and covering plates in the watch and clock making industry, for parts of counting mechanism and traversing gear, and finally as knife edges for weighing machines, for the suspension of pendulums, and the like purposes for which the sintered alloys have in many cases not proved satisfactory.

For the purpose of the present method there can be employed all hitherto known hard carbides and hard nitrides, with or without the addition of low or high fusing auxiliary metals, singly or in commixture. To these pulverulent materials there can also be added other hard substances (either natural or artificial, such as for example boron, diamond, and the like).

If hard metal bodies are to be produced by this method without the addition of auxiliary metal, for example from pure tungsten carbide, the substratum must consist of a higher fusing metal, for example metallic tungsten with a melting point of 3500° C., or of carbon. The working temperature is then kept preferably in the vicinity of the softening point (2500° C.) of the carbide powder used. In this case the pressure roller is also preferably made of pure tungsten metal. If the softening temperature used be of the order indicated, it is not necessary to apply high pressure to compound the thin consecutive layers. The temperature at which any subsequent thermal treatment is carried out depends on the nature of the auxiliary metal used or on the melting point of the mixture of auxiliary metals added. If iron or nickel be employed as auxiliary metal in the mixture, temperatures of the order of 1000–1200° C. are very well suited for carrying out the thermal after-treatment for the purpose of homogenizing the product.

A form of construction of apparatus for carrying out the method according to the present invention is shown, by way of example, in the accompanying drawing, in which.

Figure 1:
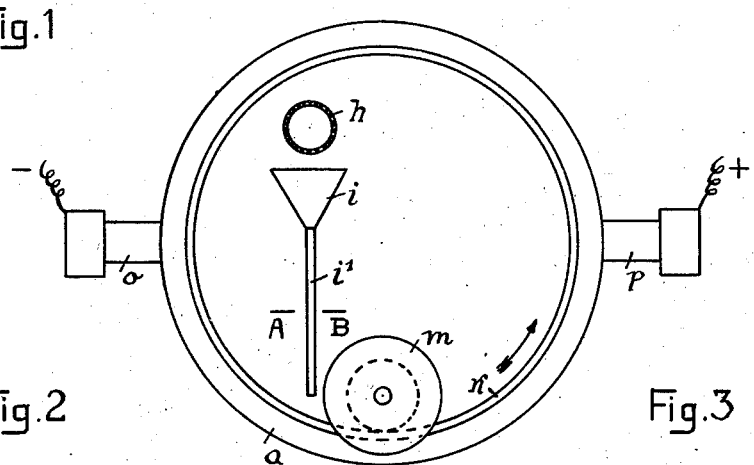
Fig. 1 shows the apparatus diagrammatically, in front elevation.
Figure 2:
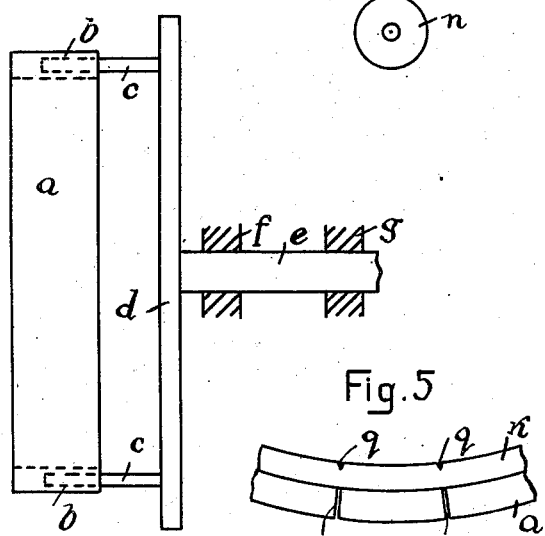
Fig. 2 is a partial side elevation of the same.

In the constructional example shown in the drawing, there is employed, as the foundation on which the consecutive thin layers of hard metal alloy are to be built up, not a flat plate but a rotary ring $a$ of rectangular cross-section and made from iron, nickel, carbon, graphite, molybdenum, or other high fusing material. This ring $a$ is provided with lateral socket holes $b$ by means of which it can be fitted to carrying pins $c$ on a rotary face plate $d$ supported by its flying shaft $e$ in bearings $f$ and $g$. The heating of the rotary ring is effected in this case for example by electric resistance heating, the ring being interposed as resistor between current conducting brushes $o$, $p$ (there being employed for example for a ring of say 20 cm. diameter and 20 mm. wide a current of 20 volts and 1500 amperes).

Preferably at the lowest point of the ring $a$ there is provided a profile roller $m$, $m'$ adapted to bear with pressure against the inner surface of the ring, the outward thrust of this roller being taken up by a counter roller $n$. In front of the roller $m$, $m'$ (with respect to the direction of rotation of the ring $a$ which is anti-clockwise in the present instance) there is disposed the discharge end of a down pipe $i^1$ leading from a hopper or funnel $i$ disposed beneath a rotary drum sieve $h$ containing the pulverulent alloy mixture to be worked up into hard metal bodies.

Figure 3:
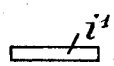
Fig. 3 is a section taken on the line A—B of Fig. 1.
Figure 4:
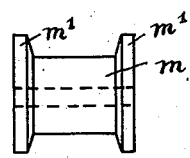
Fig. 4 is a side elevation of the profile roller used in the apparatus.
Figure 5:
Fig. 5 is a partial elevational view of the finished annular hard metal body.
Figure 6:
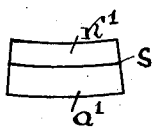
Fig. 6 shows in elevation one of the work pieces obtained from the annular body.
Figure 7:
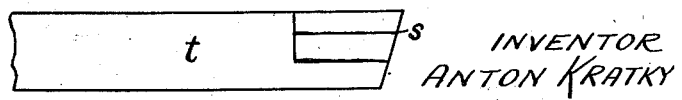
Fig. 7 shows a turning tool tipped with a body of hard metal produced in accordance with the present invention.

The mode of operation of the described apparatus is as follows:

The pulverulent alloy mixture passes from the drum sieve $h$, through the funnel $i$ (the down pipe of which is of rectangular cross-section corresponding to the breadth of the ring $a$, as shown in Fig. 3), onto the inner surface of the rotary ring $a$, and is there rolled on by the pressure roller $m$, $m'$. After one complete revolution of the ring $a$ the first hard metal layer is formed, and after some 500 revolutions the thickness of the hard metal coating on the inside of the ring has grown to about 5–7 mm. The supply of current is then interrupted, and the ring $a$ together with its coating $k$ of hard metal detached from the carrying pins $c$ on the face plate $d$. The ring $a$ is then divided up by incisions $r$ into portions, while the hard metal coating $k$ is notched correspondingly as at $q$ to permit of breaking up, by means of blows or otherwise, into individual pieces $s$ each consisting, as shown in Fig. 6, of a ring segment $a^1$ with its coating $k^1$ of hard metal. The hard metal body S thus obtained can then be secured to a tool, for instance a turning tool $t$ (Fig 7), for example by soldering.

In order to prevent oxidation of the hard metal coating, the rotating ring $a$ can be disposed beneath a bell-jar filled with protective gas, the details of this arrangement being omitted from the drawing. The specific packing means for the power transmission into the bell-jar forms no part of this invention. The heating of the ring $a$ can also be effected for example by means of a blow-pipe flame.

The pulverulent alloy mixture can also be applied hot, and can also be sprayed on layer by layer with the aid of compressed gas in the heated state, in which case the ring or other foundation member needs not necessarily to be heated.

A further advantage of the method according to the present invention consists in the possibility afforded of the automatic production of hard metal bodies and of dispensing with the use of hydraulic presses in the production of shaped hard metal bodies. The employment of hydraulic presses in this connection is difficult, cumbrous, and expensive in operation on account of the necessary tending. The term "powdered material" used in the following claims includes all materials named hereinbefore either alone or in commixture with one or more of the other materials named.

I claim:

1. The method of producing hard metal alloys from pulverulent material by hot treating and pressing the same, consisting in building up a body layer by layer on to a substratum from very thin layers of the pulverulent material which are each individually pressed in a highly heated state on to the foregoing layer until the desired thickness of the hard body is obtained.

2. The method of producing hard metal alloys from pulverulent material by hot treating and pressing the same, consisting in building up a body layer by layer on to a substratum from very thin layers of the pulverulent material which are each individually pressed in a highly heated state on to the foregoing layer in a protective atmosphere until the desired thickness of the hard body is obtained.

3. The method of producing hard metal alloys from pulverulent material by hot treating and pressing the same, consisting in building up a body layer by layer on to a substratum from very thin layers of the pulverulent material in the order of a fraction of a millimetre which are each individually pressed in a highly heated state on to the foregoing layer in a protective atmosphere until the desired thickness of the hard body is obtained.

4. The method of producing hard metal alloys from pulverulent material by hot treating and pressing the same, consisting in covering a substratum with a thin layer of pulverulent material which is highly heated and then densified and interwelded with the substratum by pressure in a protective atmosphere whereupon further thin layers one after the other are made by depositing pulverulent material on to the foregoing layer, and heating, densifying and thereby interwelding the same with the foregoing layer by pressure until the desired thickness of the hard body is obtained.

5. The method of producing hard metal alloys from pulverulent material by hot treating and pressing the same, consisting in building up a body layer by layer on to a substratum from very thin layers of the pulverulent material, which are each individually pressed by means of pressing rollers and their equivalents, in a highly heated state onto the foregoing layer in a protective atmosphere until the desired thickness of the hard body is obtained.

6. The method of producing hard metal alloys from pulverulent material by hot treating and pressing the same, consisting in covering a substratum with a thin layer of pulverulent material which is highly heated and then densified and interwelded with the substratum by pressure in a protective atmosphere whereupon further thin layers one after the other are made by depositing pulverulent material onto the foregoing finished layer, and heating, densifying and thereby interwelding the layer just made with the foregoing layer by pressure, the said pulverulent material being mixed with chemical compounds of auxiliary metals of a nature to become reduced to metal during the alloying process.

ANTON KRATKY.